United States Patent [19]

Ohsawa

[11] Patent Number: 5,977,739
[45] Date of Patent: Nov. 2, 1999

[54] STEPPING MOTOR PROVIDED WITH A DRIVE CONTROL INTEGRATED CIRCUIT HAVING A PRESTORED OPERATING PATTERN

[75] Inventor: Masayuki Ohsawa, Akishima, Japan

[73] Assignee: Nippon Pulse Motor Co., Ltd., Tokyo, Japan

[21] Appl. No.: 08/996,200

[22] Filed: Dec. 22, 1997

[30] Foreign Application Priority Data

Aug. 20, 1997 [JP] Japan .................................. 9-239063

[51] Int. Cl.$^6$ .................................................. G05B 19/40
[52] U.S. Cl. ........................................... 318/685; 318/254
[58] Field of Search .................................. 318/685, 696, 318/254, 439, 132

[56] References Cited

U.S. PATENT DOCUMENTS

| | | | |
|---|---|---|---|
| 4,473,786 | 9/1984 | Miyashita et al. | 318/561 |
| 4,684,865 | 8/1987 | Auger | 318/696 |
| 4,689,541 | 8/1987 | Jones et al. | 318/696 |
| 4,713,745 | 12/1987 | Schauder | 363/161 |
| 4,721,896 | 1/1988 | Klinger | 318/685 |
| 4,779,031 | 10/1988 | Arends et al. | 318/565 |
| 4,833,372 | 5/1989 | Kobayashi et al. | 318/696 |
| 5,038,088 | 8/1991 | Arends et al. | 318/565 |
| 5,359,271 | 10/1994 | Husher | 318/696 |
| 5,412,302 | 5/1995 | Kido et al. | 318/685 |
| 5,557,182 | 9/1996 | Hollenbeck et al. | 318/432 |
| 5,592,058 | 1/1997 | Archer et al. | 318/254 |

*Primary Examiner*—Jonathan Salata
*Attorney, Agent, or Firm*—Oliff & Berridge, PLC

[57] ABSTRACT

A drive control integrated circuit for controlling a motor, such as a stepping motor, a servo motor, or the like, which is operated by pulse signals, comprising: a memory circuit which stores parameters determining an operating pattern of said motor; a pulse generation circuit for generating said pulse signals for driving said motor based on the parameters stored in said memory circuit; a frequency variation circuit for continuously varying a frequency of said pulse signals of said pulse generation circuit based on said parameters stored in said memory circuit; a preset down counter circuit for controlling the number of pulses outputted from said pulse generation circuit based on said parameters stored in said memory circuit; a data selector circuit for selecting said parameters stored in said memory circuit; and a control circuit for monitoring the operational state of said motor for controlling the output of said pulse signals based on operational commands. Thus, the drive control integrated circuit stores in memory predetermined operating patterns, can operate the motor merely by selecting a stored operating pattern, and can minimize control by a CPU, alleviate the CPU load, and bring about simplification of the control software.

3 Claims, 6 Drawing Sheets

5,977,739

STEPPING MOTOR PROVIDED WITH A DRIVE CONTROL INTEGRATED CIRCUIT HAVING A PRESTORED OPERATING PATTERN

BACKGROUND OF THE INVENTION

1. Field of the Invention

The present invention relates to a drive control integrated circuit that stores in advance the operating pattern of a motor, and controls the operation of the motor based on the stored operating pattern.

2. Description of the Related Art

Conventionally, a dedicated control-use integrated circuit has been offered in order to control the operation of stepping motors. As shown in FIG. 6, in this control-use integrated circuit 20, parameters determining motor operation, such as the quantity of output pulses (drive amount of the stepping motor), a low speed frequency (self-activation frequency), a high speed frequency, and acceleration/deceleration data, are written in a register via a bus interface circuit 22 that interfaces with a control-use external CPU 21. When a start command is supplied via a bus line, pulse signals (CW, CCW) are outputted based on the parameters recorded in the register.

However, in the cases where the operating pattern is complex as with NC devices in machine tools, it is necessary to conduct control based on commands and data from the CPU. In such cases, it is effective to conduct control by means of the aforementioned control-use integrated circuit. However, in the cases where the operating pattern can be specified, for example, in the cases of simple operations such as reciprocal movements between specific points as with conveyance mechanisms, since it is necessary to write in the individual pieces of data from the CPU for each operation. Thus, the stepping motor control load increases for the CPU, and it has been impossible to bring about simplification of the control software.

Moreover, because of the connection of the control-use integrated circuit 20 and the external CPU 21 with the bus, it has been usual to arrange the control-use integrated circuit 20 in proximity to the CPU 21, and to connect it to a motor driver 24 by CW/CCW pulse signals or by pulse signals together with directional signals.

However, when noise interferes with the pulse signals, there is a possibility that operational errors such as positioning deviation may occur, and one must pay careful attention to the wiring to prevent noise interference.

An object of the present invention is therefore to provide a drive control integrated circuit for a stepping motor that eliminates the aforementioned problems, that stores in memory predetermined operating patterns, that can operate the motor merely by selecting a stored operating pattern, that can minimize control by a CPU, alleviate the CPU load, and bring about simplification of the control software, and that enables superior handling.

SUMMARY OF THE INVENTION

In order to achieve above object, according to a first aspect of the present invention, provided is a drive control integrated circuit for controlling a motor, such as a stepping motor, a servo motor, or the like, which is operated by pulse signals, comprising: a memory circuit which stores parameters determining an operating pattern of the motor; a pulse generation circuit for generating the pulse signals for driving the motor based on the parameters stored in the memory circuit; a frequency variation circuit for continuously varying a frequency of the pulse signals of the pulse generation circuit based on the parameters stored in the memory circuit; a preset down counter circuit for controlling the number of pulses outputted from the pulse generation circuit based on the parameters stored in the memory circuit; a data selector circuit for selecting the parameters stored in the memory circuit; and a control circuit for monitoring the operational state of the motor for controlling the output of the pulse signals based on operational commands.

According to a second aspect of the present invention, a stepping motor is provided with a drive control integrated circuit which includes: a memory circuit for storing parameters determining an operating pattern of a motor; a pulse generation circuit for generating pulse signals for driving the motor based on the parameters stored in the memory circuit; a frequency variation circuit for continuously varying a frequency of the pulse signals from the pulse generation circuit based on the parameters stored in the memory circuit; a preset down counter circuit for controlling the number of pulses outputted from the pulse generation circuit based on the parameters stored in the memory circuit; a data selector circuit for selecting the parameters stored in the memory circuit; and a control circuit for monitoring an operational state of the motor and controlling the output of the pulse signals based on operational commands.

DESCRIPTION OF THE PREFERRED EMBODIMENTS

Figure 1:
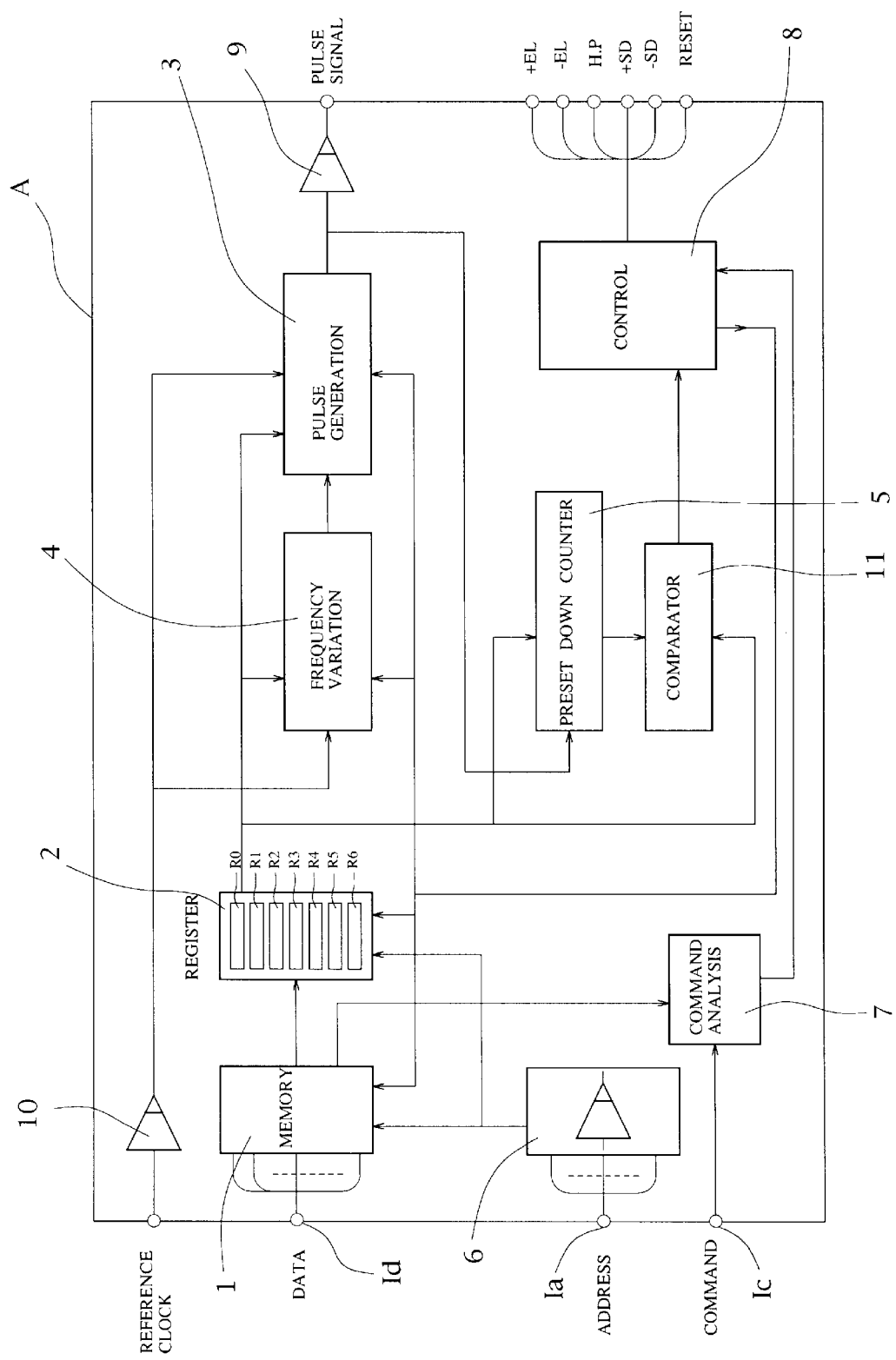
FIG. 1 is a block diagram of an integrated circuit according to the present invention.

FIG. 1 shows a block diagram of the drive control integrated circuit A for a stepping motor (hereinafter simply referred to as an integrated circuit) of the present invention. This integrated circuit A outputs pulse signals for purposes of drive control of a servomotor, a stepping motor, etc. The integrated circuit A is provided with a memory circuit 1 that stores parameters determining the operating pattern of the motor, a register 2 that records the parameters read out from among the parameters stored in this memory circuit 1, a pulse generation circuit 3 that generates pulse signals based on the parameters recorded in the register 2, a frequency variation circuit 4 that continuously varies the cycle of the pulse signals outputted by the pulse generation circuit 3 based on the parameters, a preset down counter circuit 5 that controls the number of the output pulses based on the parameters, a data selector circuit 6 that selects the required parameters from among the parameters stored in the memory circuit 1, a command analysis circuit 7 that analyzes the input commands, and a control circuit 8 that controls the output of the pulse signals based on the inputted commands and the operational state of the stepping motor.

The memory circuit 1 is composed of a nonvolatile memory, such as EEPROM, capable of writing and erasing externally. The memory circuit 1 stores control parameters and numerical parameters such as speed and pulse quantity that determine the operating pattern of the motor. The manufacturer matches the contents of the memory circuit 1 to customer specifications before shipment, or the customer, after purchase, sets the parameters and the addresses corresponding to each parameter, and has each parameter written at the set addresses in advance. These parameters are the start frequency (FL), the high speed frequency (FH) that causes high speed rotation, the acceleration rate, the deceleration rate, and so on that determine the operating pattern. Once written, these parameters can be read out at any time if the address is designated, and they are retained in the memory until rewritten. The memory is not limited to EEPROM; EPROM is also acceptable.

Each parameter stored in the memory circuit 1 is read out when the recorded address is designated, and written in the register 2. This register 2 is constituted by an FL speed setting register (hereinafter, FL register) R0 that sets the speed at the beginning of acceleration or at start-up time, an FH speed setting register (hereinafter, FH register) R1 that sets the speed at times of high speed after termination of acceleration, an acceleration rate register R2 that sets the proportions of acceleration in cases of high speed operation, a deceleration rate register R3 that sets the proportions of deceleration in cases of high speed operation, a multiplying factor setting register R4 that sets the multiplying factor relative to the value of the output pulse speed set by the speed setting register, a preset register R5 that sets the quantity of output pulses, a slow down point register R6 that sets the point of deceleration commencement, etc.

The acceleration rate (the time to reach FH from FL) and the deceleration rate (the time to reach FL from FH) are determined by motor properties, and by the torque load and load inertia of the load mechanism connected to the motor.

Figure 2:
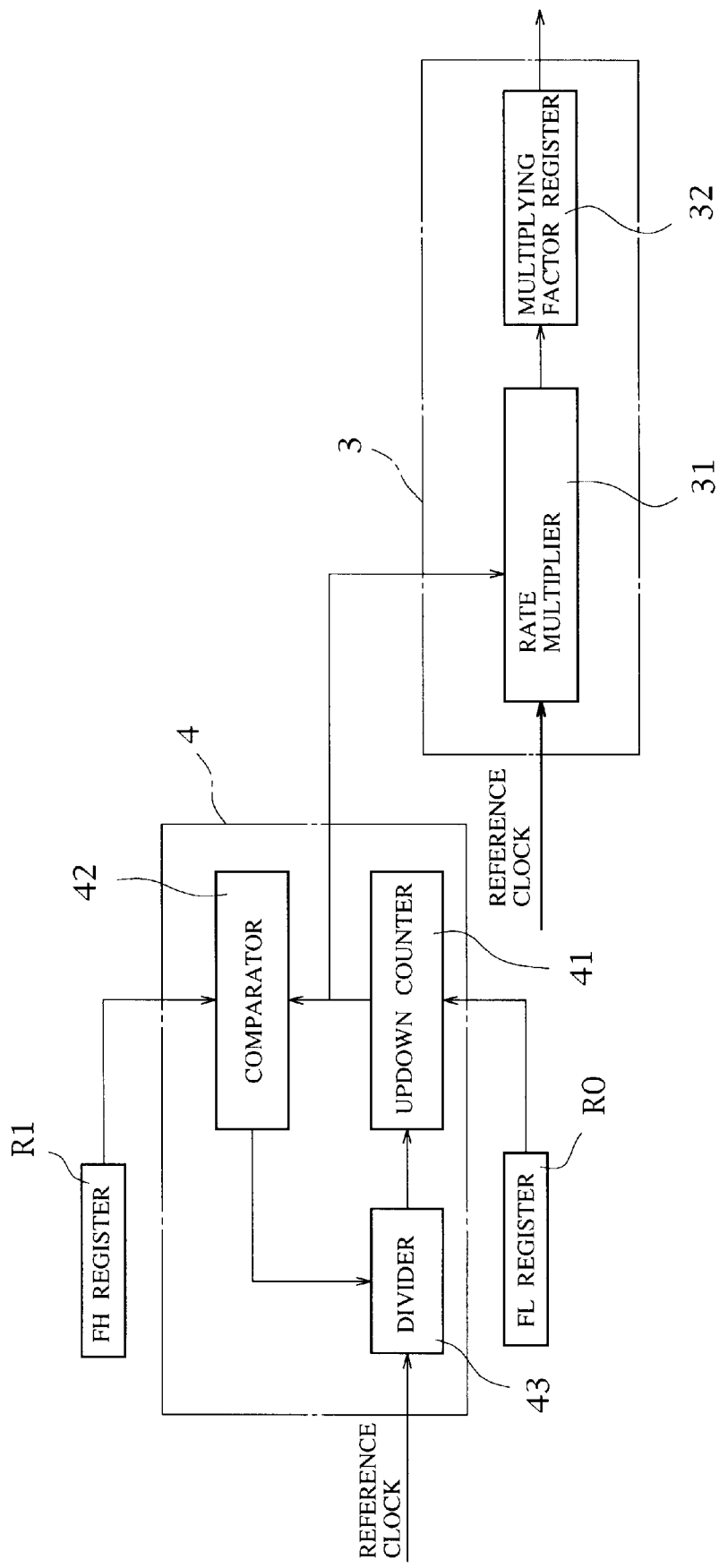
FIG. 2 is a block diagram of a frequency variation circuit and a pulse generation circuit.

As shown in FIG. 2, the frequency variation circuit 4 is constituted by an up-down counter 41 and a comparator 42. The frequency variation circuit 4 raises the frequency of the generated pulses from the low speed start frequency (FL) at which the stepping motor can be self-activated to the high speed frequency (FH) that causes high speed rotation, or lowers it from high speed frequency to the start frequency. When raised, the value of the FL register R0 is transmitted to the up-down counter 41; while counting up the up-down counter 41 by means of the counter clock that is outputted by a divider circuit 43 that divides the reference clock that was input via a buffer 10 according to the specified dividing rate (speed rate), the value of the up-down counter 41 is compared with the value of the FH register R1 by the comparator 42; when the value of the up-down counter 41 becomes equal to the value of the FH register R1, the operation of the divider circuit 43 is stopped, the counter clock is stopped, and the frequency of the output pulses is stabilized at FH. On the other hand, when lowered, the up-down counter 41 that was counted up to FH is counted down. At this time, the value of the up-down counter 41 is compared with the value of the FL register R0 by the comparator 42. When the value of the up-down counter 41 becomes equal to the value of the FL register R0, the counter clock is stopped, and the frequency of the output pulses is stabilized at FL.

The pulse generation circuit 3 is constituted by a rate multiplier 31 and a multiplying factor register 32. The pulse generation circuit 3 uses the frequency that is outputted from the frequency variation circuit 4 as input data, outputs the input data according to the cycles that divide the reference clock, converts the multiplying factor by the multiplying factor register 32, and finally outputs pulse signals through a buffer 9 according to the frequency that is outputted from the frequency variation circuit 4. The aforementioned pulse generation circuit may also be composed from an adding circuit instead of a rate multiplier.

The preset down counter circuit 5 totalizes the number of output pulses. With regard to the number of output pulses, the number of pulses recorded in the preset register R5 is preset in the preset down counter 5. The output from the pulse generation circuit 3 is applied to the preset down counter 5 as the clock and the count-down proceeds with each pulse signal that is outputted.

On the other hand, the deceleration starting point in high speed positioning operation is recorded in the slow down point register R6. This deceleration starting point sets the number of pulses from the start of deceleration until motor stoppage. The value of the preset down counter 5 and the value of the slow down point register R6 are compared by a comparison circuit 11. When the value of the preset down counter 5 becomes equal to the value of the slow down point register R6, the comparison circuit 11 informs the control circuit 8 that the stepping motor has reached the deceleration starting point. When the control circuit 8 perceives that the stepping motor has reached the deceleration starting point, it transmits the value of the FL register R0 to the comparator 42 of the frequency variation circuit 4, switches the clock of the dividing circuit 43, and counts down the up-down counter 41. When the value of the up-down counter 41 becomes the FL register R0, the control circuit 8 stops the clock of the up-down counter 41, and fixes the pulse frequency at FL.

When the value of the preset down counter 5 becomes zero, the control circuit 8 stops the input of the standard clock relative to the pulse generation circuit 3, stops the generation of pulses, stops the output of pulse signals, and stops the stepping motor.

Figure 3:
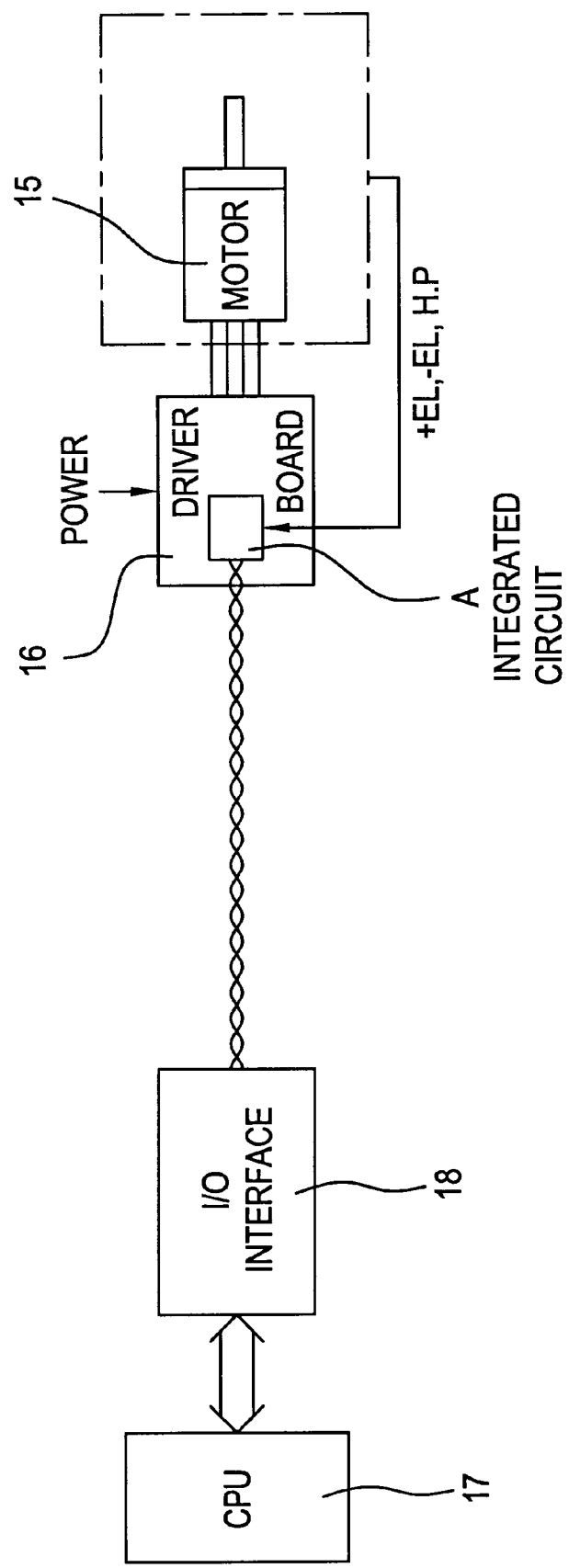
FIG. 3 is an explanatory view showing the state where the integrated circuit is used.

In the case where the motor is operated using an integrated circuit A of the aforementioned configuration, as shown in FIG. 3, the integrated circuit A is mounted on top of a driver board 16 that drives a motor 15, and the integrated circuit A and a control unit (CPU) 17 are connected via an I/O interface 18. In this state, the CPU 17 emits an address signal in order to designate the stored address of the pattern that one wishes to operate. This address signal is supplied to the address input terminal Ia, and is addressed to the memory 1 via the data selector 6. The parameters stored at the designated address are then read out, and are written into the register 2.

In addition to the address, the CPU 17 also emits command signals designating start and rotational direction. The command signals are supplied to the command input terminal Ic, are analyzed by the command analysis circuit 7, and are supplied to the control circuit 8.

For example, when the start command is inputted, the control circuit 8 inputs the standard clock that was divided by the dividing circuit 43 according to the acceleration rate into the up-down counter 41 of the frequency variation circuit 4, and continuously varies the frequency from the start frequency (FL) to the high speed frequency (FH).

The output value of the up-down counter 41 is supplied to the pulse generation circuit 3, and the pulse generation circuit 3 generates pulses according to the frequency that was supplied.

These pulses are outputted as pulse signals from the output terminal through the buffer 9.

There is no need to input the aforementioned commands by a data bus line, and a plurality of signals may be combined. One may also use ON/OFF signals for switches, etc.

According to the type of command input, the command analysis circuit 7 may be constituted by a gate circuit, or it may be constituted by buffers, or it may be constituted by bus interface.

On the other hand, the number of output pulses is also transmitted from the preset register R5 to the preset down counter 5, and the pulse signals outputted from the pulse generation circuit 3 are counted down as the clock. Furthermore, the value of the deceleration starting point recorded in the slow down point register R5 and the value of the preset down counter 5 are compared by the comparison circuit 11, and when the value of the preset down counter 5 matches the value of the deceleration starting point, the control circuit 8 switches to the slow down mode. In this slow down mode, the register compared by the comparator 42 of the frequency variation circuit 4 is switched to the FL register R0, and the frequency of the output pulse signals is continuously varied, and lowered to the starting frequency (FL) set in the FL register R0.

When the value of the preset down counter 5 becomes zero, the control circuit 8 stops the input of the standard clock to the pulse generation circuit 3, and stops the output of the pulse signals to thereby stop the stepping motor.

With the integrated circuit A of the aforementioned configuration, the operating pattern of the motor is stored in advance in the memory circuit 1. In this case, the parameters are supplied to the data input terminal Id, the memory address is supplied to the address input terminal Ia, and the parameters are recorded at the designated address on the memory circuit 1.

These parameters may be written in by the manufacturer based on customer specifications before shipment, or may be written in by the customer after purchase.

The data may be written as serial data or as parallel data.

Figure 4:
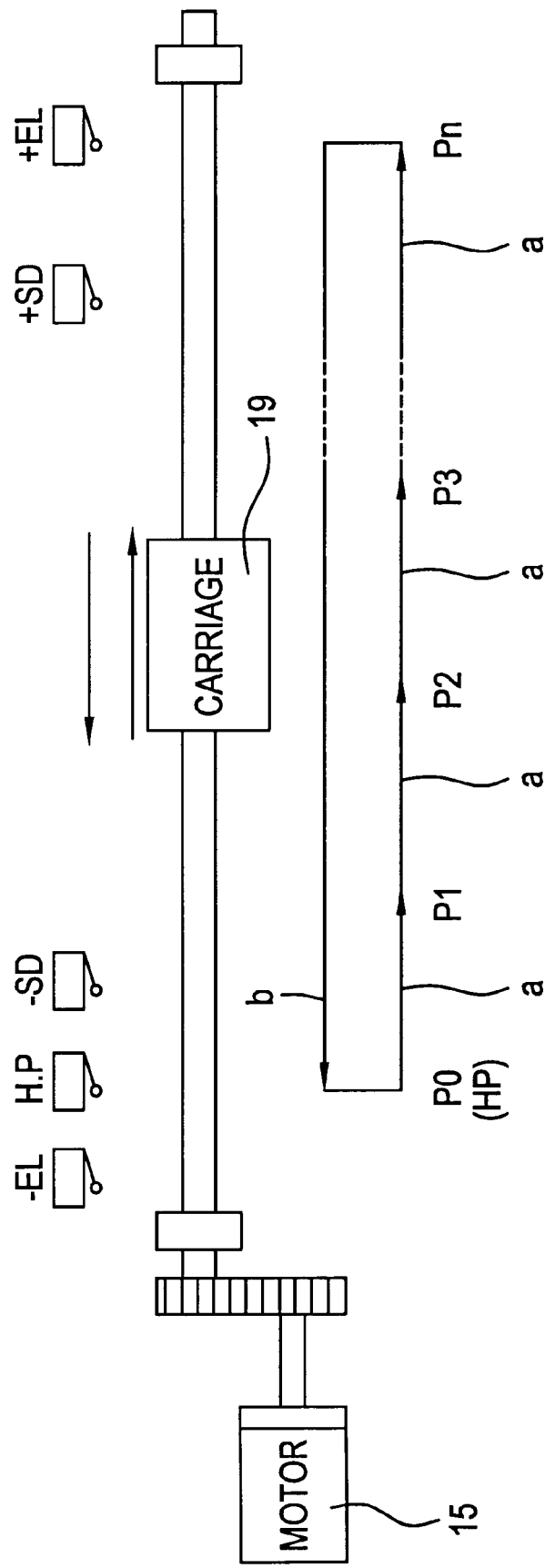
FIG. 4 is an operation explanatory view showing an example of motor control by means of the integrated circuit.

As stated above, since the pulse signals are outputted based on parameters which determine the motor operating pattern and which are stored in the memory circuit 1, it is possible to output pulse signals corresponding to the motor operating pattern by inputting command signals and address signals or only command signals, even without transmitting the parameter data and commands from the control unit each time the motor is operated. For example, as shown in FIG. 4, in the case where the motor 15 is controlled and the carriage 19 is made to repeat short operations (operating pattern a), followed by an operation returning it to the home position (HP) at high speed (operating pattern b), the memory address storing the parameters of operating pattern a is designated while in a state of stoppage at HP, and the parameters determining operating pattern a are read out and written in the register 2. After the memory address has been designated, the start command is designated. In accordance with the parameters recorded in the register 2, the pulse generation circuit 3 outputs pulse signals of the specified frequency and specified quantity only, and moves the carriage 19 to P1. If the same operating pattern is repeated, it is possible to move the carriage 19 to P2 simply by inputting the start command. After inputting the start command n times and moving the carriage 19 to Pn, when it is time to return the table to HP, the memory address that stores operating pattern b is designated, and the parameters determining operating pattern b are read out and written in the register, after which the start command is input. The pulse generation circuit raises the frequency of the pulse signals from FL to FH at the specified acceleration rate in accordance with the parameters recorded in the register, returns the carriage 19 at high speed, slows down when the slow down point is reached, lowers the pulse frequency from FH to FL, stops generation after outputting the specified number of pulses, and stops the carriage 19.

If it is possible to control a motor designating the address of the operating pattern stored in the memory circuit 1, and designating the commands, there is no need to put the command signal and address signal on a data bus line, and one can conduct the designation by switches. Consequently, one can drive the stepping motor or servomotor as an ordinary DC motor.

Moreover, since there is no need to connect the integrated circuit to a CPU bus line, one can mount the integrated circuit on a driver board arranged near the motor at some distance from the CPU, the carrying around of clocks (pulse signals) is eliminated, and noise resistance is excellent.

Figure 5:
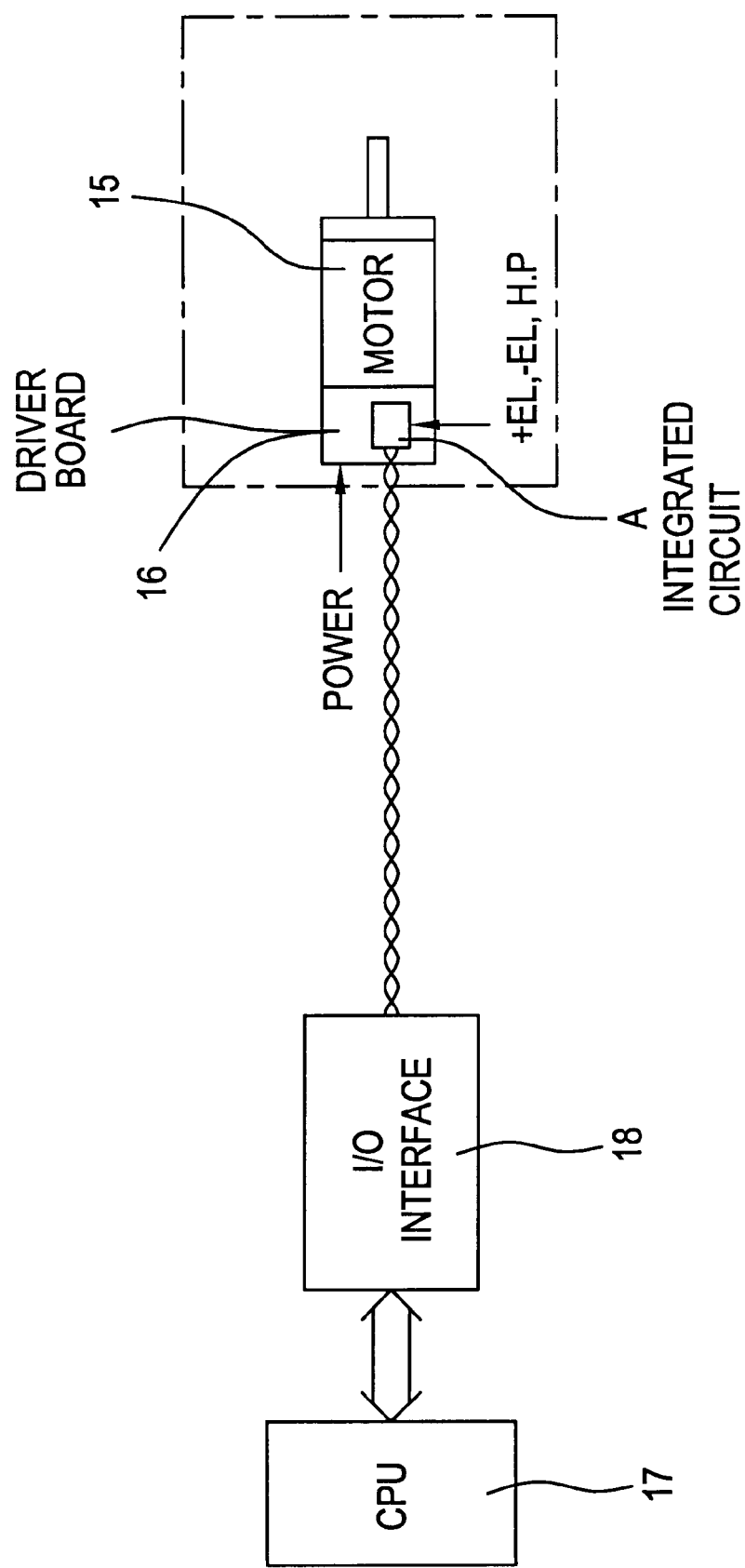
FIG. 5 is an explanatory view showing the state where a motor mounted with the integrated circuit is used.
Figure 6:
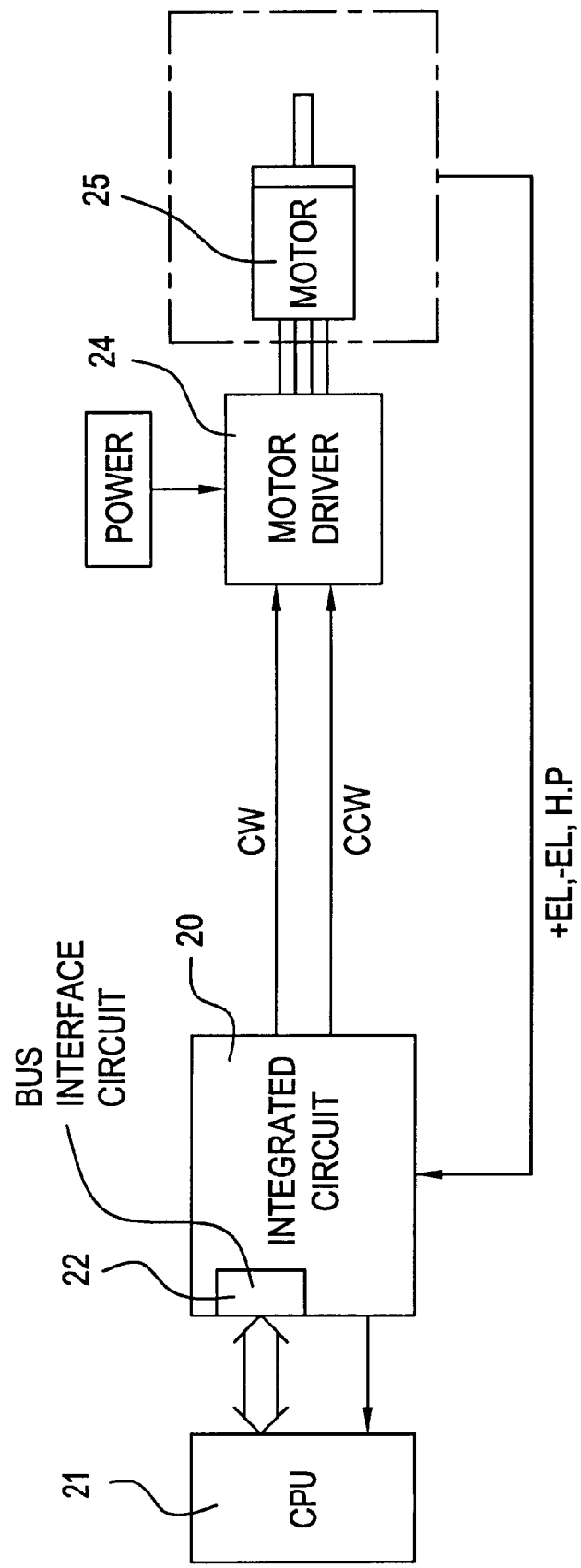
FIG. 6 is an explanatory view showing the state where a conventional integrated circuit is used.

Next, as shown in FIG. 5, the above-described integrated circuit A is inserted into a driver board 16, this driver board 16 is inserted into a stepping motor 15, and one may then integrate the integrated circuit and driver circuit with the stepping motor.

With this stepping motor, since the operating pattern of the motor is stored in advance in the memory circuit 1, the CPU is able to implement the specified operating pattern by transmitting the address and command signals to the motor via the I/O (input/output circuit), and it is possible to use the stepping motor as if it were an ordinary DC motor. Particularly in the case of simple operating patterns that can be realized by DC motors, as with the control of a DC motor by voltage application, if it is possible to input start signals, the stepping motor can be controlled without using a CPU for control, and one can realize a motor that fully utilizes the characteristics of stepping motors such as rotational frequency control and holding force while stationary. There are no limits to the scope of application.

By installing a motor unit in a device and by connecting the motor to a drive system, there is no need to separately provide a driver board. Furthermore, wiring is simplified, and it is possible to simplify the assembly process of the device.

In accordance with claim 1, since it is possible to operate pulse motors and servomotors only by inputting the address signals and command signals without inputting control data (address signals and command signals) from the CPU with a data bus line for each operation, it is possible to treat the pulse motor like an ordinary DC or AC motor.

In accordance with claim 2, since the control of compact stepping motors is mostly the repetition of specified pattern positioning, a stepping motor with a drive control integrated circuit can be operated like an ordinary motor only by inputting the address signals and command signals.

What is claimed is:

1. A drive control integrated circuit for controlling a motor which is operated by pulse signals, comprising:
    a memory circuit which stores parameters to control the operation of said motor based on predetermined operating patterns of said motor;
    a pulse generation circuit for generating said pulse signals for driving said motor based on the parameters stored in said memory circuit;
    a frequency variation circuit for continuously varying a frequency of said pulse signals of said pulse generation circuit based on said parameters stored in said memory circuit;
    a preset down counter circuit for controlling the number of pulses outputted from said pulse generation circuit based on said parameters stored in said memory circuit;

a data selector circuit for selecting said parameters stored in said memory circuit; and a control circuit for controlling the output of said pulse signals based on operational commands and an operational state of the motor by receiving address signals input by a switch mechanism to designate stored addresses of said parameters and by receiving command signals input by a switch mechanism to designate start and rotational direction of said motor.

2. A stepping motor provided with a drive control integrated circuit which includes:

a memory circuit for storing parameters to control the operation of said motor based on predetermined operating patterns of a motor;

a pulse generation circuit for generating pulse signals for driving said motor based on said parameters stored in said memory circuit;

a frequency variation circuit for continuously varying a frequency of said pulse signals from said pulse generation circuit based on said parameters stored in said memory circuit;

a preset down counter circuit for controlling the number of pulses outputted from said pulse generation circuit based on said parameters stored in said memory circuit;

a data selector circuit for selecting said parameters stored in said memory circuit; and a control circuit and controlling the output of said pulse signals based on operational commands and an operational state of the motor by receiving address signals input by a switch mechanism to designate stored addresses of said parameters and by receiving command signals input by a switch mechanism to designate start and rotational direction of said motor.

3. The stepping motor of claim 2, wherein the stepping motor has a driver board and the drive control integrated circuit is disposed on the driver board.

* * * * *